United States Patent
Chiang

(10) Patent No.: US 9,870,078 B2
(45) Date of Patent: Jan. 16, 2018

(54) TOUCH PANEL DEVICE CONTROLLING METHOD AND TOUCH PANEL DEVICE

(71) Applicant: MEDIATEK INC., Hsin-Chu (TW)

(72) Inventor: Tsung-Yueh Chiang, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 76 days.

(21) Appl. No.: 14/551,085

(22) Filed: Nov. 24, 2014

(65) Prior Publication Data

US 2015/0153860 A1   Jun. 4, 2015

Related U.S. Application Data

(60) Provisional application No. 61/911,018, filed on Dec. 3, 2013.

(51) Int. Cl.
G06F 3/041   (2006.01)

(52) U.S. Cl.
CPC ............ G06F 3/041 (2013.01); G06F 3/0416 (2013.01); *H04M 2250/22* (2013.01)

(58) Field of Classification Search
CPC ......... G06F 3/044; G06F 3/0416; H04L 63/18
See application file for complete search history.

(56) References Cited

U.S. PATENT DOCUMENTS

| | | | | |
|---|---|---|---|---|
| 2011/0304583 A1* | 12/2011 | Kruglick | ................. | G06F 3/044 345/174 |
| 2012/0139865 A1* | 6/2012 | Krah | ....................... | G06F 3/044 345/174 |
| 2013/0078923 A1* | 3/2013 | Ekbatani | ............... | H04W 8/005 455/41.2 |

FOREIGN PATENT DOCUMENTS

| | | |
|---|---|---|
| CN | 102916729 A | 2/2013 |
| CN | 102947816 A | 2/2013 |
| CN | 102982465 A | 3/2013 |

* cited by examiner

*Primary Examiner* — Sepehr Azari
(74) *Attorney, Agent, or Firm* — Han IP Corporation; Andy M. Han

(57) ABSTRACT

A touch panel device controlling method for controlling a first touch panel device which comprises: establishing a touch communications connection sequence, wherein the touch communications connection sequence comprises a plurality of touch communications connections between the first touch panel device and at least one second touch panel device; and performing a predetermined operation of the first touch panel device based on the touch communications connection sequence.

15 Claims, 11 Drawing Sheets

TOUCH PANEL DEVICE CONTROLLING METHOD AND TOUCH PANEL DEVICE

CROSS REFERENCE TO RELATED APPLICATIONS

This application claims the benefit of U.S. Provisional Application No. 61/911,018, filed on Dec. 3, 2013, the contents of which are incorporated herein by reference.

BACKGROUND

The present application relates to a touch panel device controlling method and a touch panel device, and particularly relates to a touch panel device controlling method and a touch panel device that can trigger a predetermined operation via touch communications connections.

According to the related art, Near Field Communication (NFC) can be regarded as a contactless identification and interaction technology, and can be used for performing short distance wireless communications between mobile devices, consumer electronic products, personal computers, and/or intelligent electronic devices through a method of near field magnetic coupling (e.g. using the frequency of 13.56 MHz). The users of NFC devices can intuitively exchange information and acquire contents and services with ease.

As the market for portable electronic devices such as mobile phones equipped with NFC functionalities has become mature, they can be used for supporting mobile payment or point of sale (POS) . However, as the NFC devices are designed to transmit and receive signals through magnetic coupling, it is typical to implement an inductive card reader or some components having similar functionalities in the aforementioned portable electronic devices such as the mobile phones mentioned above, which may cause the sizes of the portable electronic devices to be increased, and further cause the layouts, the structure arrangement, and the materials of components in the portable electronic devices such as the mobile phones to be limited.

Therefore, some touch communications technologies regarding touch panel devices (e.g. electronic device equipped with touch panels), such as those described in the U.S. Patent Application Publication No. 2011/0304593, the U.S. Patent Application Publication No. US 2013/0147760, the China Patent Application Publication No. CN 102916729 A, are proposed recently, where the touch panels and the driving integrated circuit (IC) in the touch panel devices can be used for performing communications and data transmission. For example, a conventional touch panel device may comprise a touch sensor. In addition, at least one portion of the touch sensor can be at least one portion of the touch panel in the conventional touch panel device, where the touch panel can be a touch panel that does not have the display functionality (e.g. a touch pad), or a touch panel that has the display functionality (e.g. a touch screen). The touch sensor may comprise multiple driving electrodes and sensing electrodes installed on substrates, such as the driving electrodes and the sensing electrodes for forming capacitor structures. At least one of the driving electrodes and the sensing electrodes can be used as transmitting electrodes, and at least one of the driving electrodes and the sensing electrodes can be used as receiving electrodes. Thus, the signals can be transmitted or received by using the electrodes and the driving IC in the conventional touch panel device, to realize touch communications based on electric fields, having no need to implement any inductive card reader or some components having similar functionalities in the conventional touch panel device, where this architecture can significantly reduce the size and save the costs, in comparison with the NFC technology.

Please refer to FIG. 1, which illustrates a diagram of touch communications between a first touch panel device 101 and a second touch panel device 102 according to the related art. As shown in FIG. 1, there are near field electric fields 103$a$ and 103$b$ between the first touch panel device 101 and the second touch panel device 102. It should be noted that each of the first touch panel device 101 and the second touch panel device 102 can have the functionalities of transmitting and receiving signals. Based on this touch communications technology, when the first touch panel device 101 transmits signals toward the second touch panel device 102, the communications medium used by the first touch panel device 101 is the electric field portion whose electric field direction is pointing toward the second touch panel device 102 (e.g. the near electric field 103$a$ shown in FIG. 1). In addition, when the second touch panel device 102 transmits signals toward the first touch panel device 101, the communications medium used by the second touch panel device 102 is the electric field portion whose electric field direction is pointing toward the first touch panel device 101 (e.g. the near electric field 103$b$ shown in FIG. 1). Please note that the X channels and the Y channels shown in FIG. 1 may represent the transmitting electrodes and receiving electrodes installed on substrates, such as the transmitting electrodes and the receiving electrodes for forming capacitor structures.

FIG. 2 is a logical block diagram of a touch communications system for realizing the touch communications between the first touch panel device 101 and the second touch panel device 102 shown in FIG. 1 according to the related art, where the touch communications system may comprise a signal transmitting system 201 and a signal receiving system 202. The first touch panel device 101 shown in FIG. 1 may comprise the signal transmitting system 201 shown in FIG. 2, and the second touch panel device 102 shown in FIG. 1 may comprise the signal receiving system 202 shown in FIG. 2. The signal transmitting system 201 may comprise a touch communications request signal generating unit 211, a communications connection establishment unit 212, and a first communications unit 213. More particularly, the touch communications request signal generating unit 211 may be arranged to generate a touch communications request signal, and to transmit the touch communications request signal to the second touch panel device 102 through the transmitting electrodes of the first touch panel device 101. After the first touch panel device 101 receives a response signal responded by the second touch panel device 102, such as the response signal received through the receiving electrodes of the first touch panel device 101, the communications connection establishment unit 212 may establish a communications connection with the second touch panel device 102 (i.e. the communications connection between the first touch panel device 101 and the second touch panel device 102). After the communications connection establishment unit 212 establishes the communications connection, the first communications unit 213 may transmit communications information and/or data to the second touch panel device 102 through the transmitting electrodes of the first touch panel device 101.

The signal receiving system 202 may comprise a touch communications request signal responding unit 221, a communications connection establishment unit 222, and a second communications unit 223. More particularly, after receiving the touch communications request signal transmitted by the first touch panel device 101, such as the touch communications request signal received through the receiving electrodes of the second touch panel device 102, the touch communications request signal responding unit 221 may respond to the touch communications request signal with a response signal such as that mentioned above, and more particularly, may send the response signal to the first touch panel device 101 through the transmitting electrodes of the second touch panel device 102. After the touch communications request signal responding unit 221 responds to the touch communications request signal of the first touch panel device 101 with the response signal, the communications connection establishment unit 222 may establish the communications connection with the first touch panel device 101 (i.e. the communications connection between the first touch panel device 101 and the second touch panel device 102). After the communications connection establishment unit 222 establishes the communications connection, the second communications unit 223 may receive the communications information and/or data from the first touch panel device 101 through the receiving electrodes of the second touch panel device 102.

FIG. 3 illustrates a first touch panel 301 of the first touch panel device 101 shown in FIG. 1 and a second touch panel 302 of the second touch panel device 102 shown in FIG. 1 according to the related art. As shown in FIG. 3, each touch panel of the first touch panel 301 and the second touch panel 302 may comprise a touch sensor (not completely shown in FIG. 3). For example, the touch sensor of the first touch panel 301 may comprise a set of transmitting electrodes installed on at least one substrate of the first touch panel 301 (e.g. the transmitting electrode 311) for transmitting signals, and may comprise a set of receiving electrodes installed on at least one substrate of the first touch panel 301 (e.g. the receiving electrode 312) for receiving signals. In another example, the touch sensor of the second touch panel 302 may comprise a set of transmitting electrodes installed on at least one substrate of the second touch panel 302 (e.g. the transmitting electrode 321) for transmitting signals, and may comprise a set of receiving electrodes installed on at least one substrate of the second touch panel 302 (e.g. the receiving electrode 322) for receiving signals.

FIG. 4 is a flowchart of a touch communications method according to the related art. First, in Step S401, the touch communications request signal generating unit 211 of the first touch panel device 101 may generate a touch communications request signal such as that mentioned above, and transmit the touch communications request signal to the second touch panel device 102 through the transmitting electrode(s) of the first touch panel device 101. Afterward, in Step S402, the touch communications request signal responding unit 221 of the second touch panel device 102 may respond to the touch communications request signal with a response signal such as that mentioned above through the transmitting electrode(s) of the second touch panel device 102, and more particularly, send the response signal to the first touch panel device 101 through the transmitting electrode(s) of the second touch panel device 102. After the first touch panel device 101 receives the response signal responded by the second touch panel device 102, such as the response signal received through the receiving electrodes of the first touch panel device 101, in Step S403, the communications connection establishment unit 212 of the first touch panel device 101 and the communications connection establishment unit 222 of the second touch panel device 102 may establish a communications connection such as that mentioned above (i.e. the communications connection between the first touch panel device 101 and the second touch panel device 102). As a result, in Step S404, the first touch panel device 101 (more particularly, the first communications unit 213 therein) and the second touch panel device 102 (more particularly, the second communications unit 223 therein) may perform communications as shown in FIG. 4. For example, the first communications unit 213 of the first touch panel device 101 may transmit the communications information and/or data to the second touch panel device 102 through the transmitting electrodes of the first touch panel device 101, and the second communications unit 223 of the second touch panel device 102 may receive the communications information and/or data from the first touch panel device 101 through the receiving electrodes of the second touch panel device 102.

With the need of performing various operations through the above mentioned touch communications technology, there is a need for a novel touch panel device controlling method and touch panel device capable of triggering various operations to be performed by different touch communications connection sequences.

SUMMARY

Therefore, one objective of the present application is to provide a touch panel device controlling method that can trigger a predetermined operation for a first touch panel device based on touch communications connections.

Another objective of the present application is to provide a touch panel device that can trigger a predetermined operation based on touch communications connections.

One exemplary embodiment of the present application discloses a touch panel device controlling method for controlling a first touch panel device which comprises: establishing a touch communications connection sequence, wherein the touch communications connection sequence comprises a plurality of touch communications connections between the first touch panel device and at least one second touch panel device; and performing a predetermined operation of the first touch panel device based on the touch communications connection sequence.

One exemplary embodiment of the present application discloses a touch panel device, which comprises: a touch panel; and a processing unit, capable of establishing a touch communications connection sequence with aid of the touch panel, wherein the touch communications connection sequence comprises a plurality of touch communications connections between the touch panel device and at least one second touch panel device. The processing unit is capable of controlling the touch panel device to perform a predetermined operation based on the touch communications connection sequence.

Another exemplary embodiment of the present application discloses a touch panel device, which comprises: a touch panel; and a processing unit, capable of establishing a touch communications connection sequence to a first touch panel device with aid of the touch panel and capable of triggering the first touch panel device to perform a predetermined operation based on the touch communications connection sequence, wherein the touch communications connection sequence comprises a plurality of touch communications connections between the touch panel device and the first touch panel device.

In view of above-mentioned exemplary embodiments, the predetermined operation of the first touch panel device can be triggered by different combinations of touch communications connections. By this way, an user can control the first touch panel device more conveniently.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Each of FIG. 6

DETAILED DESCRIPTION

Figure 1:
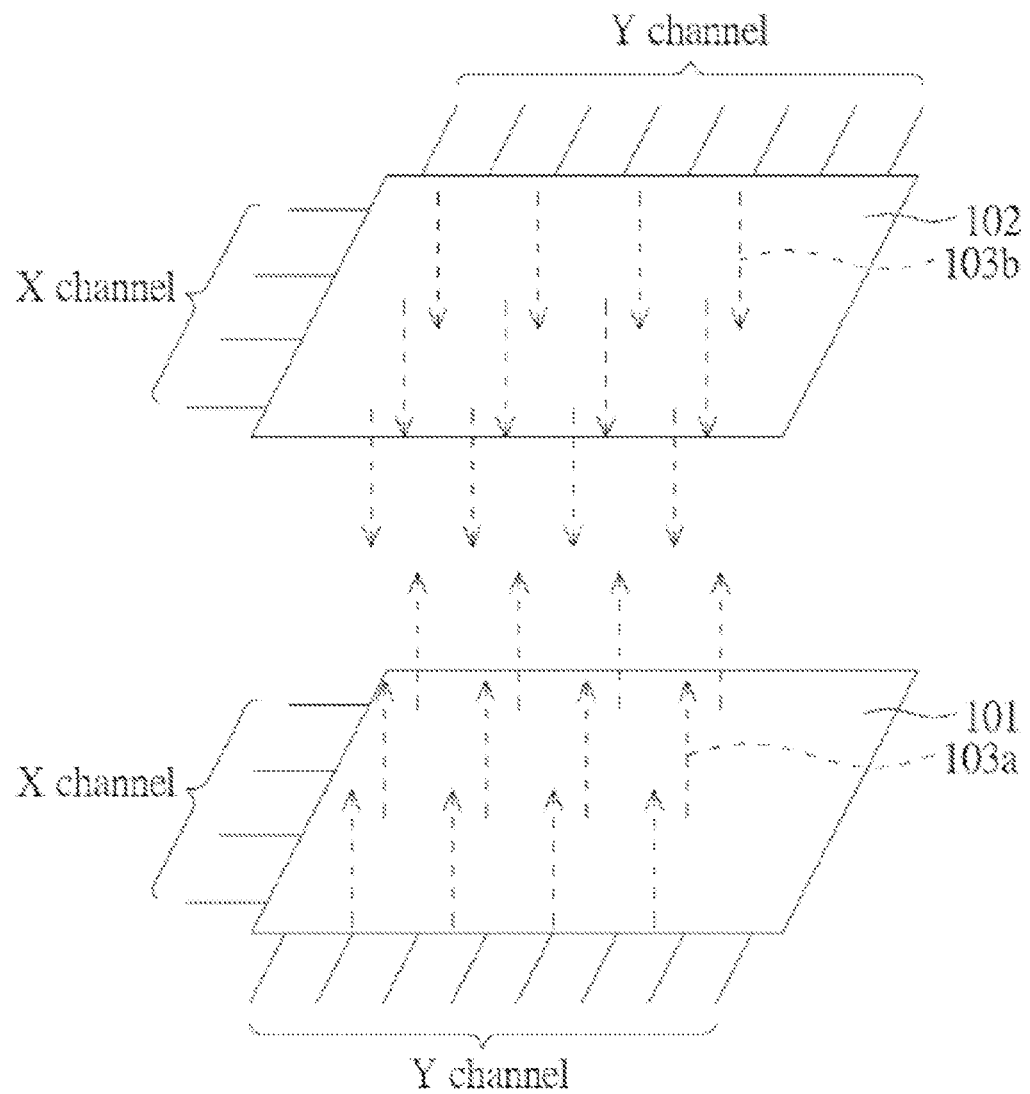
FIG. 1 is a diagram of touch communications between a first touch panel device and a second touch panel device according to the related art.
Figure 2:
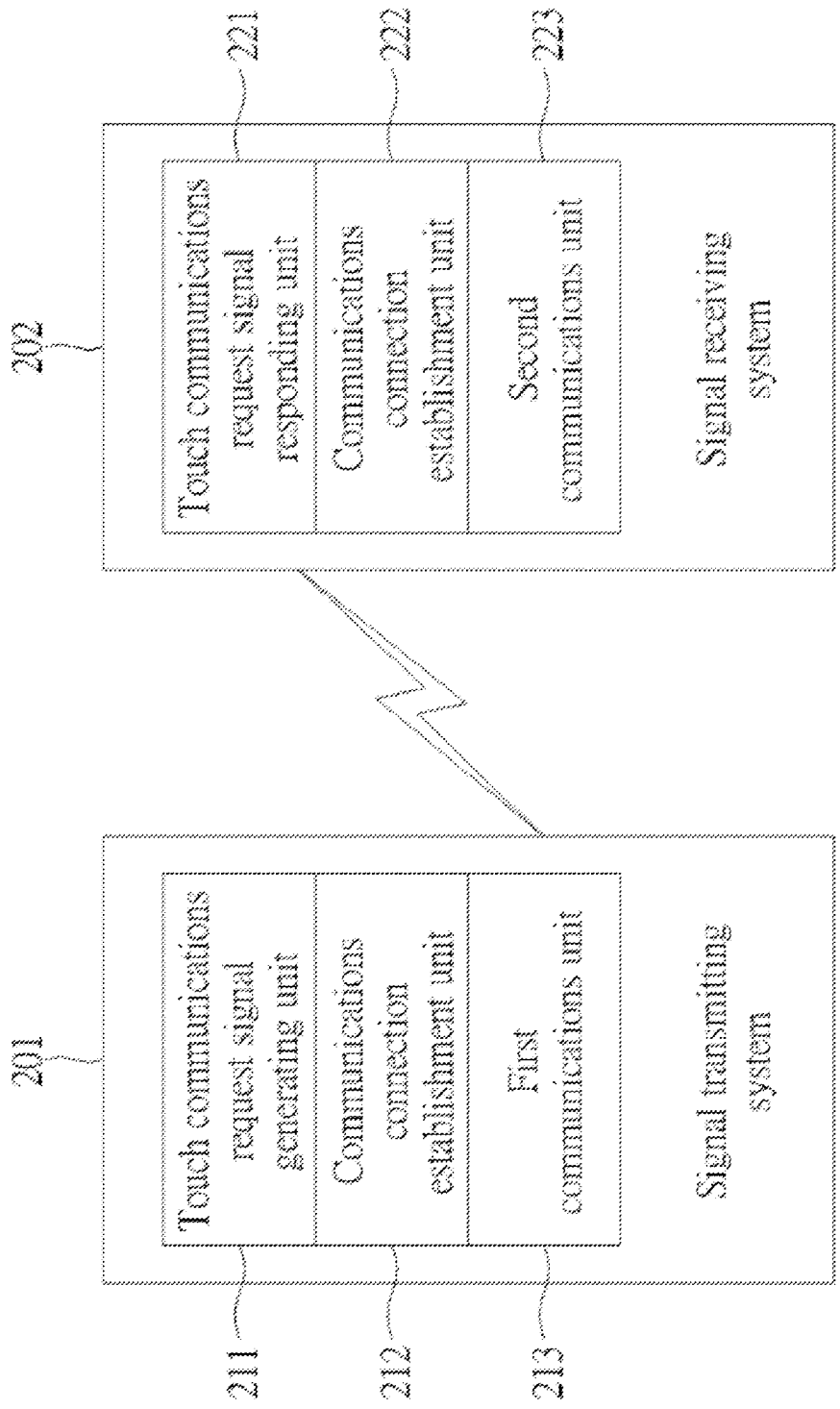
FIG. 2 is a logical block diagram of a touch communications system for realizing the touch communications between the first touch panel device and the second touch panel device shown in FIG. 1 according to the related art.
Figure 3:
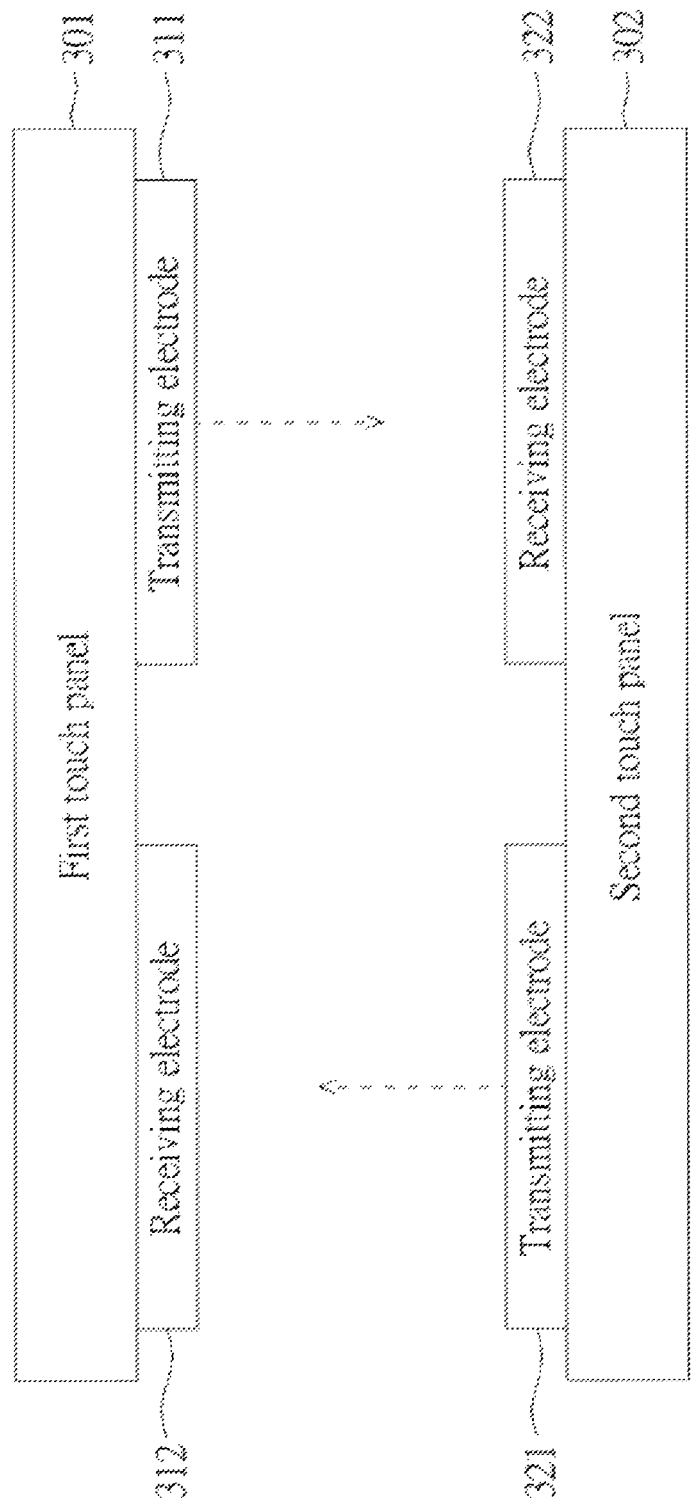
FIG. 3 illustrates a first touch panel of the first touch panel device shown in FIG. 1 and a second touch panel of the second touch panel device shown in FIG. 1 according to the related art.
Figure 4:
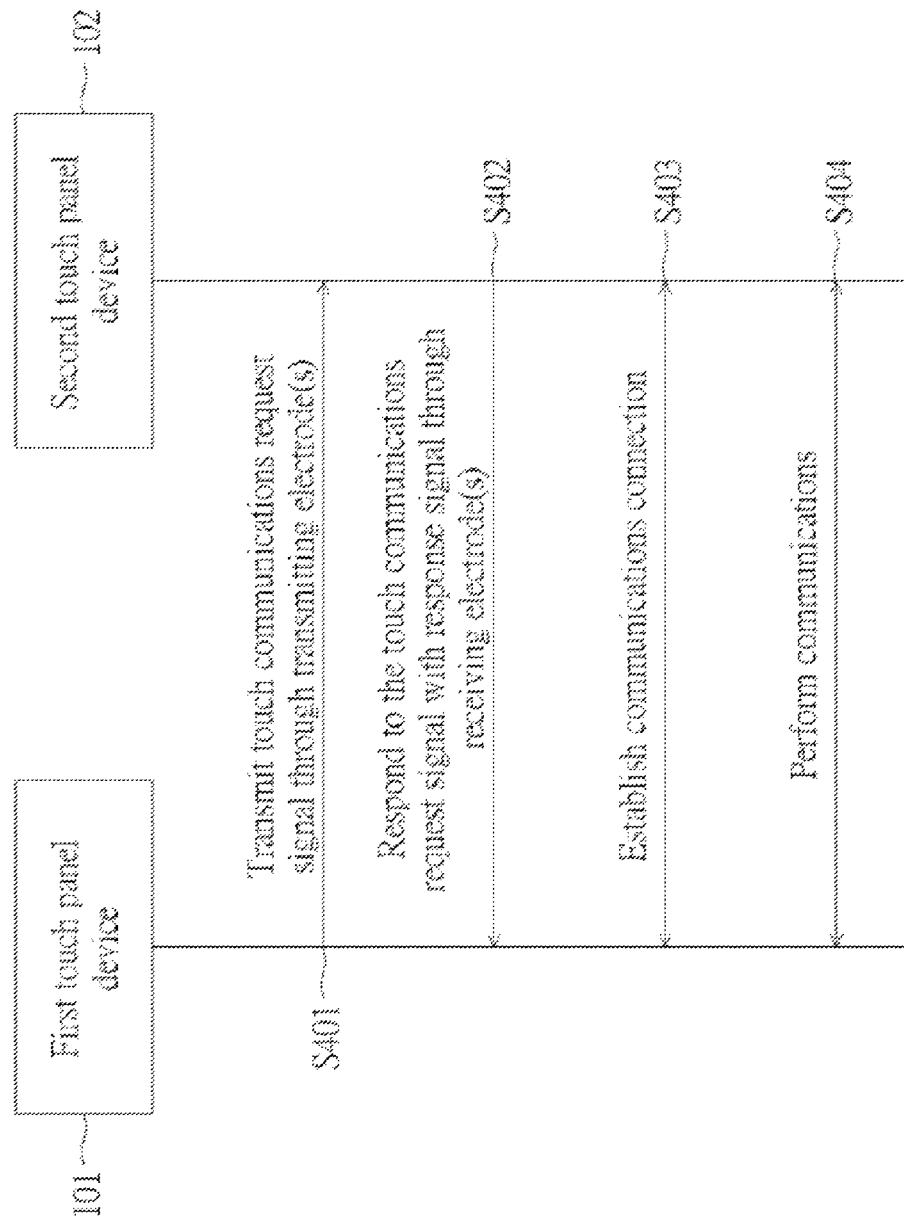
FIG. 4 is a flowchart of a touch communications method according to the related art.
Figure 5:
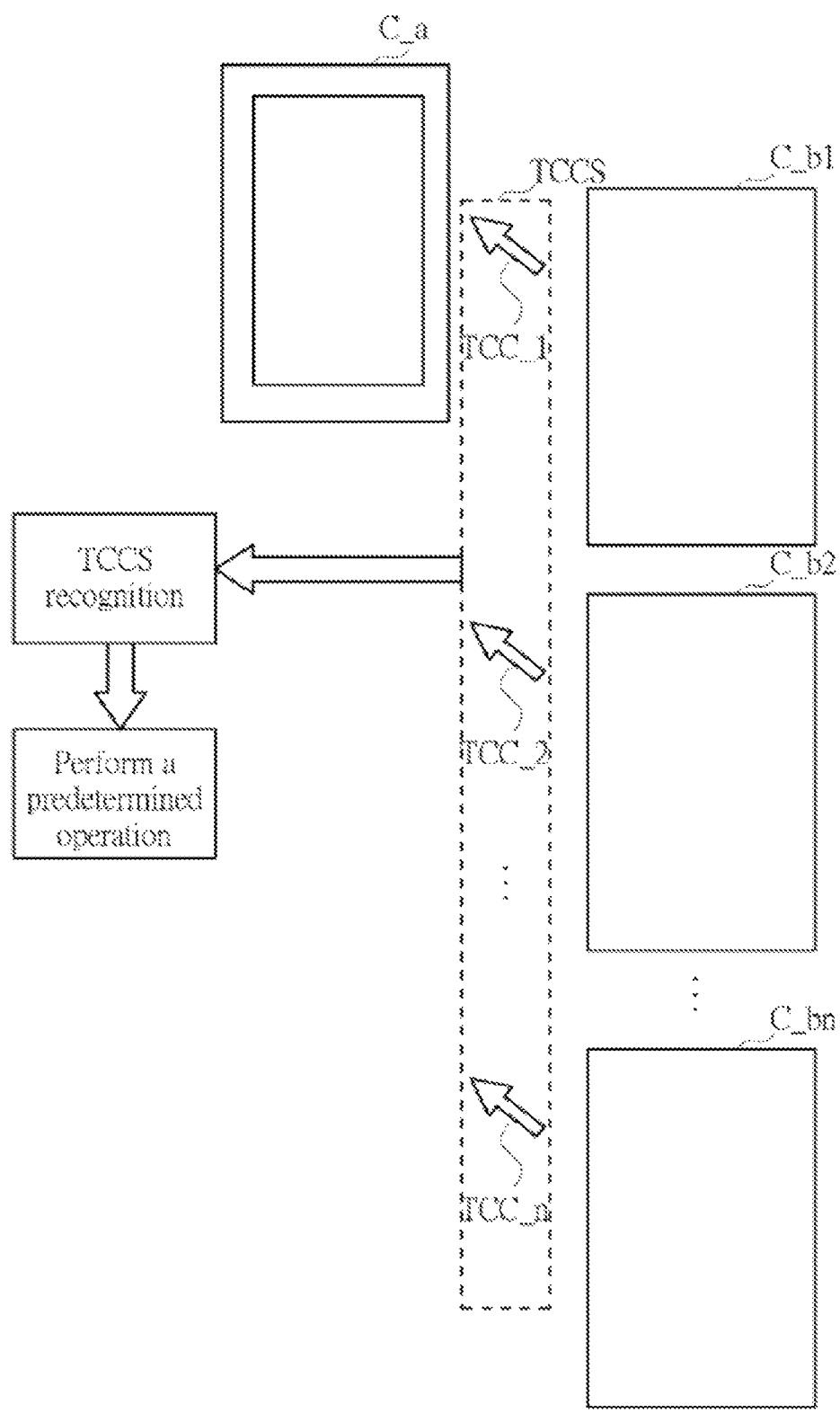
FIG. 5 is a schematic diagram illustrating the operation for a touch panel device controlling method according to one exemplary embodiment of the present application.

FIG. 5 is a schematic diagram illustrating the operation for a touch panel device controlling method according to one exemplary embodiment of the present application. A touch panel device may be any electronic device equipped with at least one touch panel, such as a mobile phone, a wearable device, a tablet, a laptop, a kiosk, a television, etc. The touch panel can be a touch panel that does not have the display functionality (e.g. a touch pad), or a touch panel that has the display functionality (e.g. a touch screen). As shown in FIG. 5, a touch communications connection sequence TCCS may be established between a first touch panel device C_a and at least one second touch panel devices Cb1, Cb2, . . . Cbn. Please note the second touch panel devices Cb1, Cb2, . . . Cbn can mean a single second touch panel device or mean more than one second touch panel devices. The touch communications connection sequence TCCS may include a plurality of touch communications connections TCC_1, TCC_2 . . . TCC_n. The touch communications connection can be established based on the steps illustrated in FIG. 1 and FIG. 4, but can be established via other steps as well. Then a predetermined operation may be performed by the first touch panel device C_a based on the touch communications connection sequence TCCS.

To establish touch communications connection, a first touch panel of a first touch panel device may be close to or in contact with a second touch panel of a second touch panel device. The first touch panel of the first touch panel device is close to or in contact with the second touch panel of the second touch panel device can mean that the distance between the first touch panel and the second touch panel is not larger than a predetermined distance. For example, if the predetermined distance is 2 cm, the first touch panel is close to or in contact with the second touch panel can mean that the distance between the first touch panel and the second touch panel is not larger than 2 cm. This is for illustrative purpose only, but not a limitation. The predetermined distance may vary with the touch panel, its driving IC, and the design of the electronic device, and may be greater, such as 5 cm, or may be less, such as 2 mm, and so on.

Further, a touch communications connection sequence recognition may be performed. For example, it may be determined that if the touch communications connection sequence TCCS follows a recognizing rule, to generate a determining result. Then the predetermined operation may be performed by the first touch panel device C_a based on the determining result. For example, if the touch communications connection sequence TCCS follows a recognizing rule, perform the predetermined operation of the first touch panel device. If not, do not perform the predetermined operation of the first touch panel device.

In one exemplary embodiment, performing a predetermined operation may include, but not limited to, controlling a device other than the second touch panel device (s), executing an application installed in the first touch panel device, etc. According to some exemplary embodiments, the operations of controlling the device other than the second touch panel device (s) may vary. For example, when a first touch communications connection sequence is established and follows a recognizing rule, a processing unit (not shown) may control the first touch panel device C_a to turn on a TV and to remotely control the TV to switch to a predetermined channel. In another example, when a second touch communications connection sequence is established and follows a recognizing rule, the processing unit may control the first touch panel device C_a to turn on an air condition system. In another example, when a third touch communications connection sequence is established and follows a recognizing rule, the processing unit may control the first touch panel device C_a to turn on an audio playback system and to remotely control the audio playback system to play a predetermined audio program. This is for illustrative purposes only, and is not meant to be a limitation of the present invention. According to some exemplary embodiments, the operations of executing the application may vary. For example, when a fourth touch communications connection sequence is established and follows a recognizing rule, the first touch panel device C_a may run an electronic mail (e-mail) application. In another example, when a fifth touch communications connection sequence is established and follows a recognizing rule, the first touch panel device C_a may run a web page browser application. In another example, when a sixth touch communications connection sequence is established and follows a recognizing rule, the first touch panel device C_a may run a ticket service application. This is for illustrative purposes only, and is not meant to be a limitation of the present invention.

The recognizing rule is a criterion for determining if the predetermined operation for the first touch panel device should be performed or not, and can be set corresponding to different situations. For example, the recognizing rule may include: an amount of the touch communications connections is not less than a predetermined touch communications connection number. For another example, if an amount of the second touch panel device is more than one, the recognizing rule may include: the touch communications connections are established in a predetermined order by the second touch panel devices. In one exemplary embodiment, the touch communications connection sequence mentioned above is established in a predetermined total time interval.

Alternatively, the recognizing rule may include: each time difference between each time point at which the touch communications connection is established is smaller than a predetermined connection time interval. The detail for each example of the recognizing rule will be described later. Please note the recognizing rule is not limited to include a single criterion. For example, the recognizing rule can include: an amount of the touch communications connections is not less than a predetermined touch communications connection number, and each time difference between each time point at which the touch communications connection is established is smaller than a predetermined connection time interval.

Figure 6:
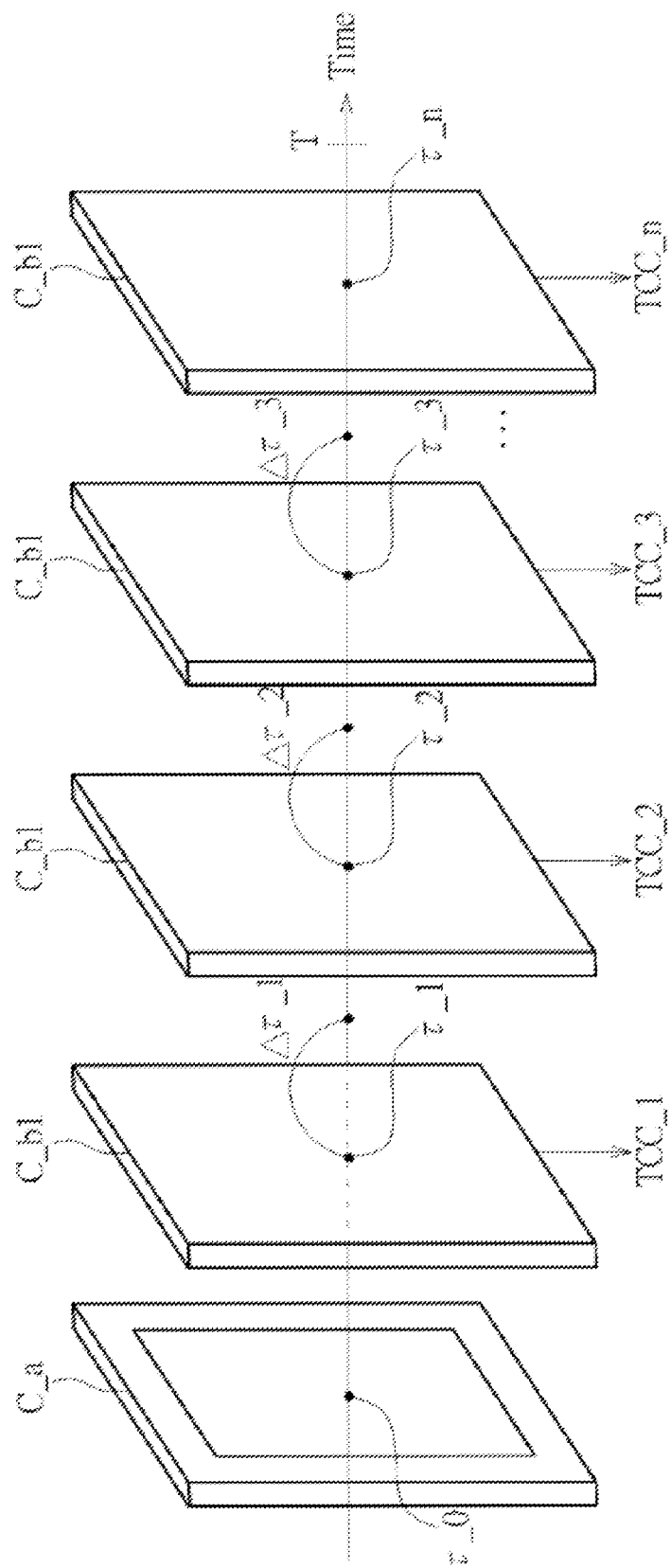
FIG. 6A is a schematic diagram illustrating that touch communications connections are established between a first touch panel device and a second touch panel device, according to one exemplary embodiment of the present application.
Figure 6A:
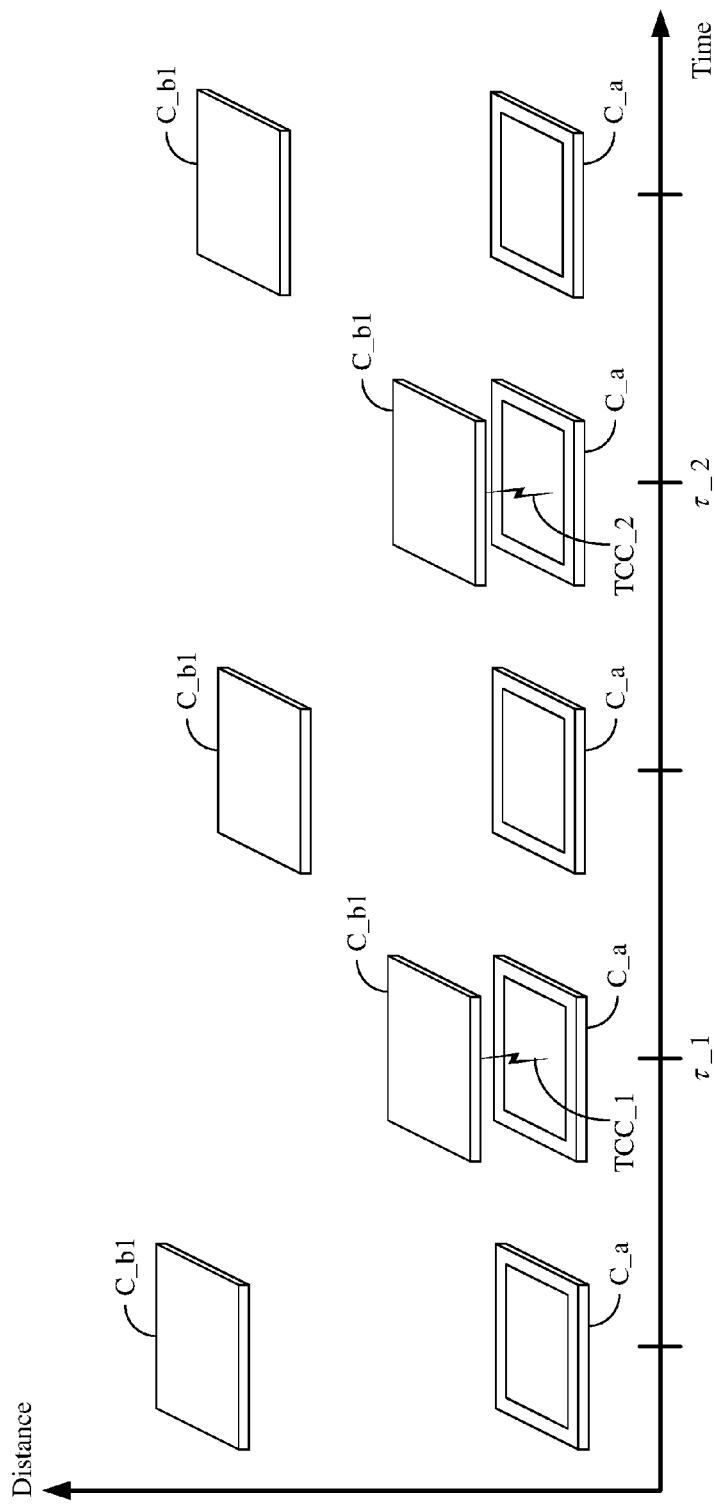

Each of FIG. 6 and FIG. 6A is a schematic diagram illustrating that touch communications connections are established between a first touch panel device and a second touch panel device, according to one exemplary embodiment of the present application. As shown in FIG.6, the touch communications connections TCC_1, TCC_2...TCC_n may be established between a first touch panel device C_a and the same one second touch panel device Cb1. The second touch panel device Cb1 may be close to or in contact with the first touch panel device C_a at a time point $\tau\_1$ thereby the touch communications connection TCC_1 is established. After the touch communications connection TCC_1 is established, the touch panel device C_b1 may leave after a time interval $\Delta\tau\_1$ passes. After that, the touch panel device C_b1 may be close to or in contact with the first touch panel device C_a at a time point $\tau\_2$ again thereby another touch communications connection TCC_2 is established. In another example, after the touch communications connection TCC_1 is established, the touch panel device C_b1 may leave. And after the time interval $\Delta\tau\_1$ passes, the touch panel device C_b1 may be close to or in contact with the first touch panel device C_a at the time point $\tau\_2$ again thereby another touch communications connection TCC_2 is established. By the similar way, the following touch communications connections TCC_3...TCC_n may be established.

As illustrated above, in one exemplary embodiment the recognizing rule may include: an amount of the touch communications connection is not less than a predetermined touch communications connection number. For example, assuming the predetermined touch communications connection number is 2, it will be determined that if the amount of the touch communications connections established between the first touch panel device C_a and the second touch panel device C_b1 is not less than 2; if the amount of the established touch communications connections is 4 and thus not less than 2, as shown in FIG. 6, the touch communications connection sequence is recognized. Assuming the predetermined touch communications connection number is 5, it will be determined that if the amount of the touch communications connections established between the first touch panel device C_a and the second touch panel device C_b1 is not less than 5; if the amount of the established touch communications connections is 4 and thus less than 5, as shown in FIG. 6, the touch communications connection sequence is not recognized. In one exemplary embodiment, it will also be determined that if the touch communications connection sequence is established in a predetermined total time interval T. That is, the touch communications connections should be established in the predetermined total time interval T, or the touch communications connection sequence is not recognized even the amount of the touch communications connections is not less than the predetermined touch communications connection number.

As illustrated above, in another exemplary embodiment the recognizing rule may include: each time difference between each time point at which the touch communications connection is established is smaller than a predetermined connection time interval. For example, the time differences ($\tau\_2-\tau\_1$), ($\tau\_3-\tau\_2$) ... ($\tau\_n-\tau\_n-1$) are smaller than a predetermined connection time interval in the exemplary embodiment of FIG. 6.

Figure 7:
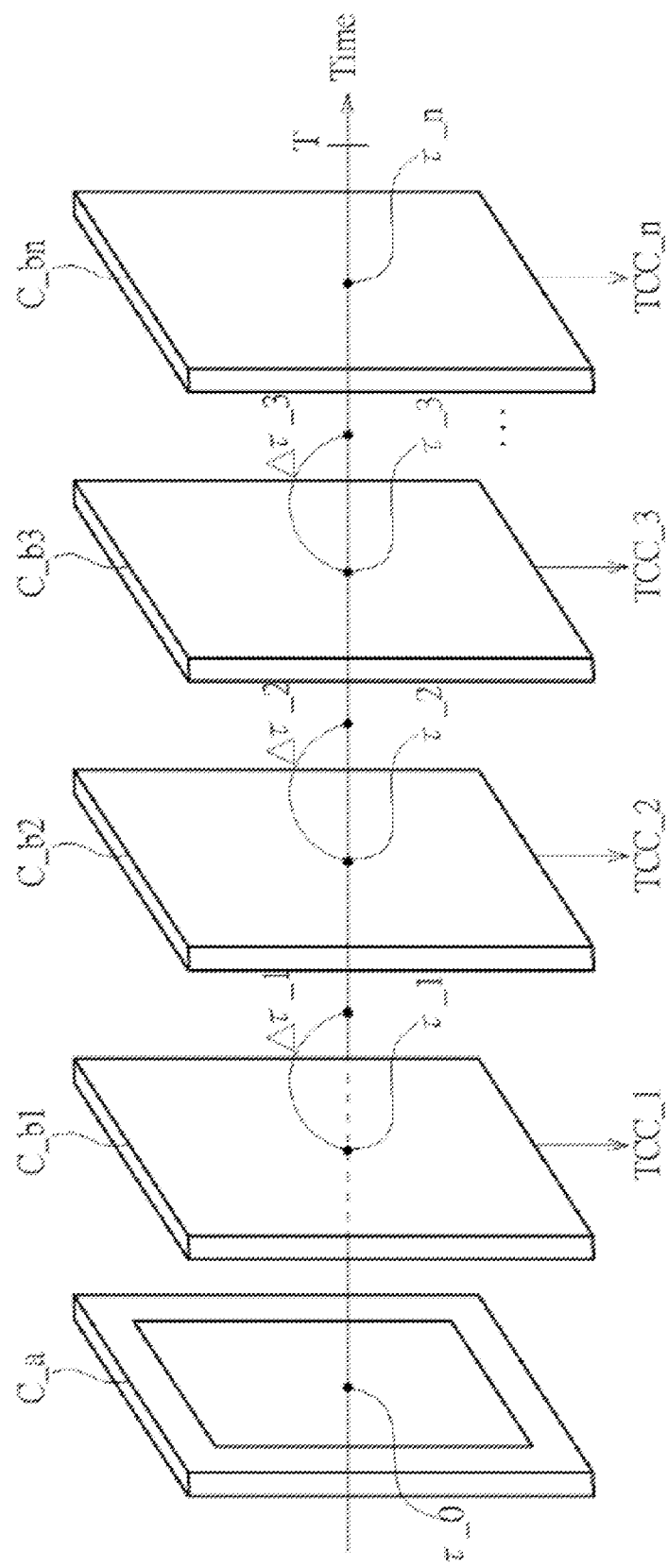
FIG. 7 is a schematic diagram illustrating that touch communications connections are established between a first touch panel device and more than one second touch panel devices, according to one exemplary embodiment of the present application.

FIG. 7 is a schematic diagram illustrating that touch communications connections are established between a first touch panel device and more than one second touch panel devices, according to one exemplary embodiment of the present application. The difference between the exemplary embodiments illustrated in FIG. 6 and FIG. 7 is that the touch communications connections in FIG. 6 are established between a first touch panel device and a single second touch panel device, while the touch communications connections in FIG. 7 are established between a first touch panel device and more than one second touch panel device C_b1, Cb2...C_bn.

The recognizing rule applied to the exemplary embodiment in FIG. 6 can be applied to the exemplary embodiment in FIG. 7 as well. That is, the recognizing rule can include: an amount of the touch communications connections is not less than a predetermined touch communications connection number, and/or include: each time difference between each time point at which the touch communications connection is established is smaller than a predetermined connection time interval.

Besides, since different second touch panel devices are applied in the exemplary embodiment of FIG. 7, the recognizing rule can include: the touch communications connections are established in a predetermined order by the second touch panel devices. For example, assuming the predetermined order is C_b2-C_b3-C_b1, it will be determined that if three touch communications connections are established sequentially between the first touch panel device C_a and the second touch panel device C_b2, the second touch panel device C_b3 and the second touch panel device C_b1, or the touch communications connection sequence is not recognized. In another example, assuming the predetermined order is C_b5-C_b1-C_b3-C_b2-C_b6, it will be determined that if five touch communications connections are established sequentially between the first touch panel device C_a and the second touch panel device C_b5, the second touch panel device C_b1, the second touch panel device C_b3, the second touch panel device C_b2 and the second touch panel device C_b6, or the touch communications connection sequence is not recognized.

It will be appreciated that each of the second touch panel device in FIG. 7 is not limited to establish only one touch communications connection with the first touch panel device C_a. For example, the predetermined order can be C_b1-C_b2-C_b1, which requires the second touch panel device C_b1 to establish touch communications connection with the first touch panel device C_a twice, one before the second touch panel device C_b2 establishing connection and one after that. Additionally, please note, the order and the amount of the touch communications connections illustrated in FIG. 6 and FIG. 7 are only for example and do not mean to limit the scope of the present application. Besides, different recognizing rules, such as different predetermined touch communications connection numbers, different predetermined orders, etc., may correspond to the same or different predetermined operations to perform. For example, the first recognizing rule (e.g. not less than the number M of connections are established between the first touch panel device C_a and the second touch panel device C_b1 in a predetermined total time interval T) and the second recognizing rule (e.g. not less than the number N of connections are established between the first touch panel device C_a and the second touch panel device C_b1 in a predetermined total time interval T) may correspond to the same operation (e.g. control the first touch panel device C_a to turn on a TV and to remotely control the TV to switch to a predetermined channel) or different operations (e.g. respectively control the first touch panel device C_a to turn on a TV and to remotely control the TV to switch to a predetermined channel, and the first touch panel device C_a to run an electronic mail application). For another example, the first recognizing rule (e.g. not less than the number M of connections are established between the first touch panel device C_a and the second touch panel device C_b1 in a predetermined total time interval T) and the third recognizing rule (e.g. touch communications connections are established in the predetermined order C_b2-C_b1) may correspond to the same operation (e.g. control the first touch panel device C_a to turn on an audio playback system and to remotely control the audio playback system to play a predetermined audio program) or different operations (e.g. respectively control the first touch panel device C_a to run a web page browser application or a ticket service application).

Figure 8:
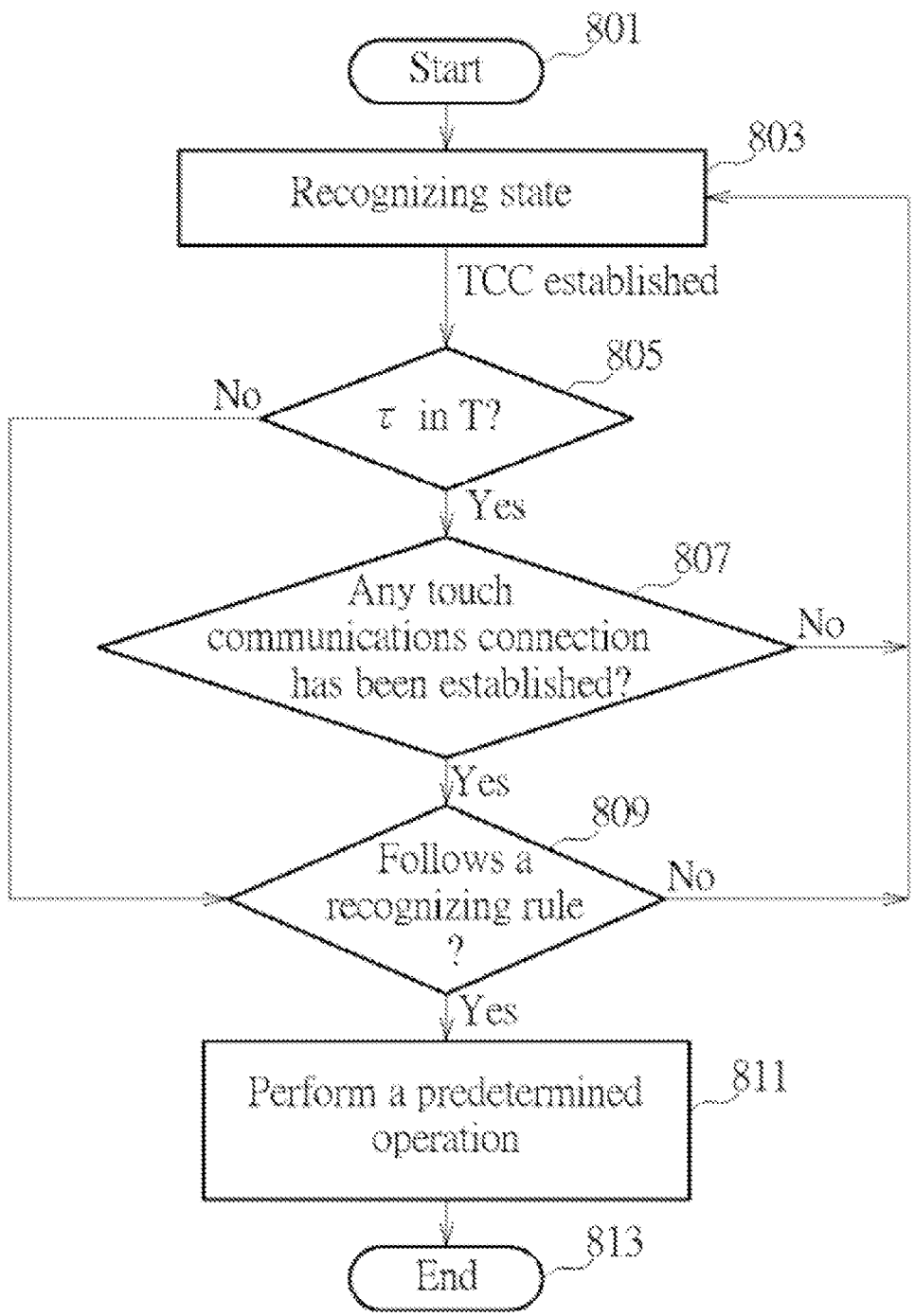
FIG. 8 is a flow chart illustrating exemplary steps for a touch panel device controlling method according to one exemplary embodiment of the present application.

FIG. 8 is a flow chart illustrating exemplary steps for a touch panel device controlling method according to one exemplary embodiment of the present application. As shown in FIG. 8, the touch panel device controlling method comprises:

Step 801

Start.

Step 803

The first touch panel device can be in a recognizing state. A touch communications connection sequence can be established and determined in such state. In one exemplary embodiment, the recognizing state is maintained for a predetermined total time interval (ex. T in FIG. 6 and FIG. 7).

Step 805

If a touch communications connection is to be established or established, determine if a time point that a touch communications connection established between the first touch panel device and a second touch panel device is in the predetermined total time interval. That is, determine if the time points $\tau\_1, \tau\_2 \ldots \tau\_n$ is in the predetermined total time interval T. If yes, proceed to step 807. If not, the process proceeds to step 809. This step may be performed by a processing unit of the first touch panel device, a processing unit of the second touch panel device, or both. Via such step, the touch communications connections out of the predetermined total time interval T may be excluded from the touch communications connection sequence.

Step 807

Determine if any touch communications connection has been established. If yes, go to the step 809, if not, go back to the step 803. This step may be performed by a processing unit of the first touch panel device, a processing unit of the second touch panel device, or both. The touch communications connection may be established by one or both of the first and second touch panel devices with aid of one or both of the first and second touch panels. In the exemplary embodiment that the touch communications connection sequence includes a plurality of touch communications connections, if only one touch communications connection is established so far, the touch communications connection sequence is not formed thus the step 809 is not needed yet.

Step 809

Determine if the touch communications connection sequence follows a recognizing rule. A determining result may be generated accordingly. If yes, go to step 811, if not, go back to the step 803. This step may be performed by a processing unit of the first touch panel device, a processing unit of the second touch panel device, or both.

Step 811

Perform a predetermined operation. The predetermined operation may be performed based on the touch communications connection sequence. More particularly, the predetermined operation may be performed based on the determining result generated in step 809. The processing unit of the first touch panel device may control the first touch panel device to perform the predetermined operation.

Step 813

End.

Please note the steps illustrated in FIG. 8 are only an example and does not mean to limit the scope of the present application. The steps may be executed in any other order and one or more steps may be omitted. For example, step 809 may be executed before step 803, between step 807 and step 809, after step 809, or after step 811. Besides, in some exemplary embodiments, step 809 may be omitted.

In the above-mentioned exemplary embodiments, a portable electronic device with a touch panel may be applied as examples for the first and second touch panel devices, to illustrate the exemplary embodiments of the present application. The above-mentioned operations can be performed by a processing unit (not illustrated) provided in the portable electronic device. As described above, the above-mentioned exemplary embodiments can be applied to other kinds of electronic devices.

Figure 9:
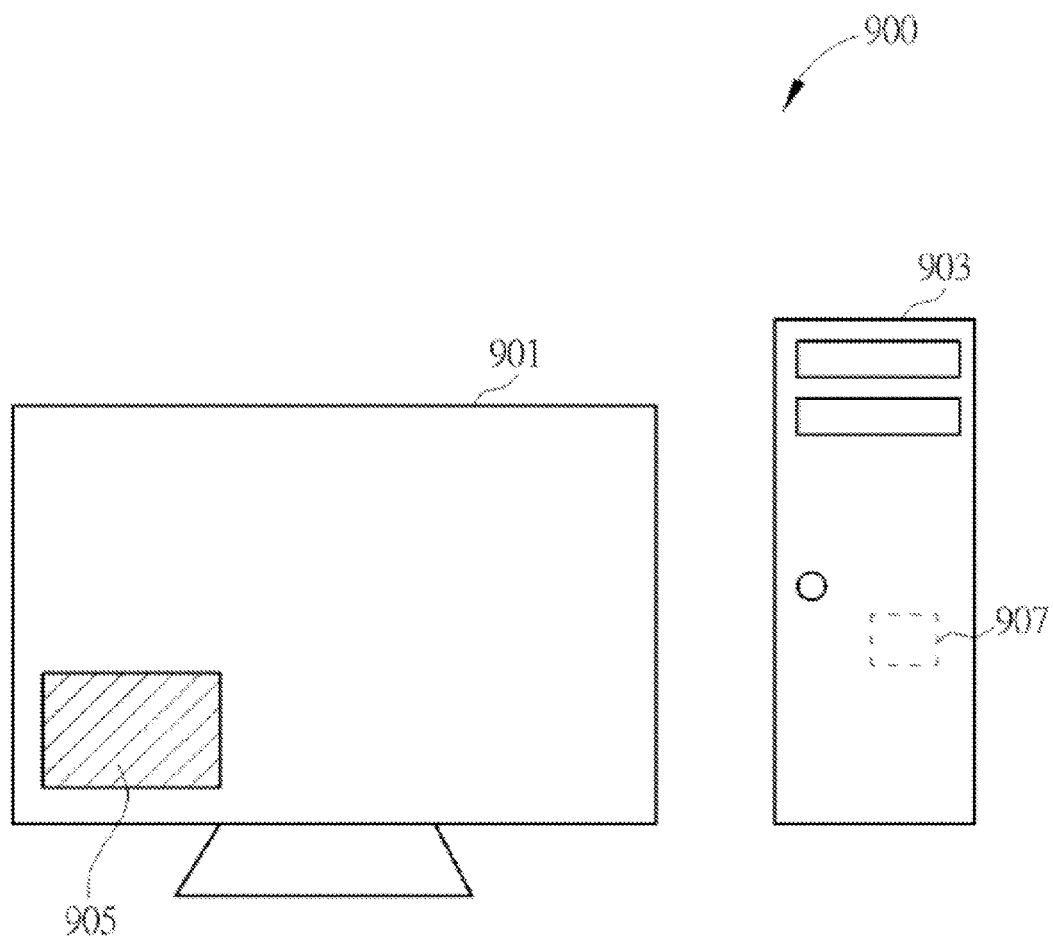
FIG. 9 and FIG. 10 are examples for the first touch panel device applying the touch panel device controlling method provided by the present application.
Figure 10:
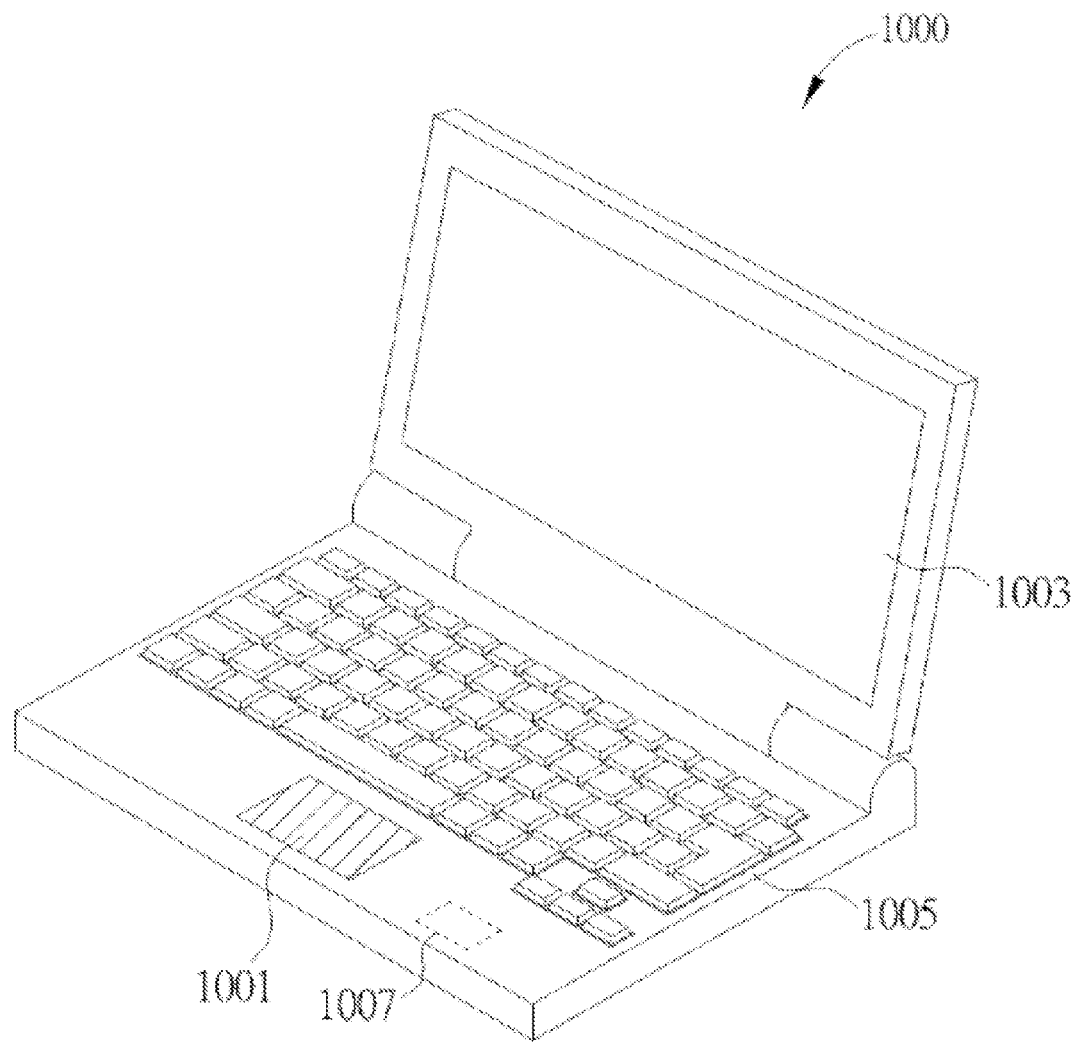

FIG. 9 and FIG. 10 are examples for the touch panel device applying the touch panel device controlling method provided by the present application. In FIG. 9, a touch panel device 900, which is a computer system, comprises a display 901 and a host case 903. To reduce cost, there may only a portion 905 of the display 901 is equipped with touch function (e.g. being a touch panel). In another example, the whole display 901 may be a touch screen. The host case 903, which can comprise conventional computer devices such as a hard disk (not illustrated) or a processing unit 907, is capable of controlling the display 901. The processing unit 907 in the host case 903 is capable of establishing the touch communications connection(s) between the touch panel device 900 and at least one another touch panel device via the touch panel 905 to form a touch communications connection sequence. That is, the other touch panel device may be close to or in contact with the touch panel 905 and then the processing unit 907 may establish the touch communications connection(s). The processing unit 907 is also capable of determining if the touch communications connection sequence follows a recognizing rule to generate a determining result.

In FIG. 10, the touch panel device 1000 is a laptop comprising a touch panel 1001, a display 1003, a body 1005 and a processing unit 1007. However, this is for illustrative purpose only, the touch panel device 1000 can be any electronic device equipped with at least one touch panel, such as a tablet, a kiosk, a television, etc. The touch panel 1001 is provided on the body 1005. The processing unit 1007 is capable of establishing the touch communications connection(s) between the touch panel device 1000 and at least one another touch panel device via the touch panel 1001. The processing unit 1007 is also capable of determining if the touch communications connection sequence follows a recognizing rule to generate a determining result.

For the exemplary embodiments of FIG. 9 and FIG. 10, when the touch panel device 900/1000 acts as a first touch panel device, the processing unit 907/1007 is also capable of controlling the touch panel device 900/1000 to perform a predetermined operation based on the touch communications connection sequence. When the touch panel device 900/1000 acts as a second touch panel device, the processing unit 907/1007 is also capable of triggering the first touch panel device to perform a predetermined operation based on the touch communications connection sequence. The computer system and the laptop shown in FIGS. 9 and 10 are for illustrative purpose only, the touch panel device can be any other electronic devices equipped with touch panel.

Please note the predetermined operation of the first electronic device can be triggered according to a touch communications connection sequence which is determined if it follows a recognizing rule or not. Accordingly, in view of above-mentioned exemplary embodiments, the touch panel device, which serves as the above-mentioned first touch panel device, can be summarized as: a touch panel device comprising: a touch panel; and a processing unit, capable of establishing a touch communications connection sequence with aid of the touch panel, wherein the touch communications connection sequence comprises a plurality of touch communications connections between the touch panel device and at least one second touch panel device. The processing unit is capable of controlling the touch panel device to perform a predetermined operation of the touch panel device based on the touch communications connection sequence.

Further, the touch panel device, which serves the above-mentioned second touch panel device, can be summarized as: a touch panel device, comprising: a touch panel; and a processing unit, capable of establishing a touch communications connection sequence to a first touch panel device with aid of the touch panel and capable of triggering the first touch panel device to perform a predetermined operation based on the touch communications connection sequence, wherein the touch communications connection sequence comprises a plurality of touch communications connections between the touch panel device and the first touch panel device.

In view of above-mentioned exemplary embodiments, the predetermined operation of the first touch panel device can be triggered by different touch communications connection sequences. By this way, a user can perform various operations more conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel device controlling method, for controlling a first touch panel device, comprising:

establishing at least one touch communications connection sequence, wherein each of the at least one touch communications connection sequence respectively comprises a plurality of touch communications connections between the first touch panel device and at least one second touch panel device as a result of relative movements between the first touch panel device and the at least one second touch panel device varying a distance therebetween; and performing a predetermined operation of the first touch panel device based on the at least one touch communications connection sequence, wherein different predetermined operations are performed based on different touch communications connection sequences of the at least one touch communication connection sequence.

2. The touch panel device controlling method of claim 1, wherein an amount of the second touch panel device is one.

3. The touch panel device controlling method of claim 2, further comprising:

determining whether the at least one touch communications connection sequence satisfies a recognizing rule, wherein the recognizing rule is satisfied by one or more of:

a number of touch communications connections established between the first touch panel device and a single second touch panel device being no less than a predetermined number of connections;

a length of time during which the plurality of touch communications connections are established between the first touch panel device and the single second touch panel device being less than a predetermined length of time;

a time interval between every two consecutive touch communications connections of the plurality of touch communications connections being less than a predetermined time interval; and an order in which the plurality of touch communications connections are established between the first touch panel device and the single second touch panel device matches a predetermined order.

4. The touch panel device controlling method of claim 1, wherein an amount of the second touch panel device is more than one.

5. The touch panel device controlling method of claim 4, further comprising:

determining whether the at least one touch communications connection sequence satisfies a recognizing rule, wherein the recognizing rule is satisfied by one or more of:

a number of touch communications connections established between the first touch panel device and multiple second touch panel devices being no less than a predetermined number of connections;

a length of time during which the plurality of touch communications connections are established between the first touch panel device and the multiple second touch panel devices being less than a predetermined length of time;

a time interval between every two consecutive touch communications connections of the plurality of touch communications connections being less than a predetermined time interval; and an order in which the plurality of touch communications connections are established between the first touch panel device and the multiple second touch panel devices matches a predetermined order.

6. The touch panel device controlling method of claim 1, wherein the predetermined operation comprises: executing an application installed in the first touch panel device.

7. The touch panel device controlling method of claim 1, wherein the first touch panel device comprises:
   a touch panel; and
   a processing unit coupled to the touch panel;
   wherein the processing unit establishes the touch communications connections between the first touch panel device and the second touch panel device via the touch panel.

8. A touch panel device, comprising:
   a touch panel; and
   a processing unit, capable of establishing at least one touch communications connection sequence with aid of the touch panel,
   wherein each of the at least one touch communications connection sequence respectively comprises a plurality of touch communications connections between the touch panel device and at least one second touch panel device as a result of relative movements between the touch panel device and the at least one second touch panel device varying a distance therebetween,
   wherein the processing unit is capable of controlling the touch panel device to perform a predetermined operation based on the at least one touch communications connection sequence, and
   wherein different predetermined operations are performed based on different touch communications connection sequences of the at least one touch communications connection sequence.

9. The touch panel device of claim 8, wherein an amount of the second touch panel device is one.

10. The touch panel device of claim 9, wherein the processing unit is capable of determining whether the at least one touch communications connection sequence satisfies a recognizing rule, and wherein the recognizing rule is satisfied by one or more of:
   a number of touch communications connections established between the touch panel device and a single second touch panel device being no less than a predetermined number of connections;
   a length of time during which the plurality of touch communications connections are established between the touch panel device and the single second touch panel device being less than a predetermined length of time;
   a time interval between every two consecutive touch communications connections of the plurality of touch communications connections being less than a predetermined time interval; and
   an order in which the plurality of touch communications connections are established between the touch panel device and the single second touch panel device matches a predetermined order.

11. The touch panel device of claim 8, wherein an amount of the second touch panel device is more than one.

12. The touch panel device of claim 11, wherein the processing unit is capable of determining whether the at least one touch communications connection sequence satisfies a recognizing rule, and wherein the recognizing rule is satisfied by one or more of:
   a number of touch communications connections established between the touch panel device and multiple second touch panel devices being no less than a predetermined number of connections;
   a length of time during which the plurality of touch communications connections are established between the touch panel device and the multiple second touch panel devices being less than a predetermined length of time;
   a time interval between every two consecutive touch communications connections of the plurality of touch communications connections being less than a predetermined time interval; and
   an order in which the plurality of touch communications connections are established between the touch panel device and the multiple second touch panel devices matches a predetermined order.

13. The touch panel device of claim 8, wherein the predetermined operation comprises: executing an application installed in the touch panel device.

14. A touch panel device, comprising:
   a touch panel; and
   a processing unit, capable of establishing at least one touch communications connection sequence to a first touch panel device with aid of the touch panel and capable of triggering the first touch panel device to perform different predetermined operations based on different touch communications connection sequences of the at least one touch communications connection sequence,
   wherein each of the at least one touch communications connection sequence respectively comprises a plurality of touch communications connections between the touch panel device and the first touch panel device as a result of relative movements between the touch panel device and the first touch panel device varying a distance therebetween.

15. The touch panel device of claim 14, wherein the processing unit is capable of determining whether the at least one touch communications connection sequence satisfies a recognizing rule, and wherein the recognizing rule is satisfied by one or more of:
   a number of touch communications connections established between the touch panel device and the first touch panel device being no less than a predetermined number of connections;
   a length of time during which the plurality of touch communications connections are established between the touch panel device and the first touch panel device being less than a predetermined length of time;
   a time interval between every two consecutive touch communications connections of the plurality of touch communications connections being less than a predetermined time interval; and
   an order in which the plurality of touch communications connections are established between the touch panel device and the first touch panel device matches a predetermined order.

* * * * *